US008744365B2

(12) United States Patent
Kim et al.

(10) Patent No.: US 8,744,365 B2
(45) Date of Patent: Jun. 3, 2014

(54) MOBILE COMMUNICATION DEVICE, A PRINTING CONTROL SYSTEM, AND A METHOD FOR CONTROLLING PRINTING USING THE MOBILE COMMUNICATION DEVICE

(75) Inventors: Hyung-chan Kim, Youngin-si (KR); Chang-gi Kwon, Seoul (KR); Hee-min Kwon, Seoul (KR); Hyun-keun Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 935 days.

(21) Appl. No.: 12/049,532

(22) Filed: Mar. 17, 2008

(65) Prior Publication Data

US 2009/0011708 A1  Jan. 8, 2009

(30) Foreign Application Priority Data

Jul. 6, 2007  (KR) .................. 10-2007-0068154

(51) Int. Cl.
*H04B 7/00* (2006.01)
*H04M 1/00* (2006.01)
*H04M 1/24* (2006.01)
*H04M 3/08* (2006.01)
*H04M 3/22* (2006.01)

(52) U.S. Cl.
USPC ................ 455/66.1; 455/556.1; 379/29.1

(58) Field of Classification Search
USPC .......... 455/66.1, 554.2, 556.1, 557; 379/29.1, 379/88.13, 119, 135
See application file for complete search history.

(56) References Cited

U.S. PATENT DOCUMENTS

| 7,385,721 | B2 * | 6/2008 | Shahindoust ................ 358/1.15 |
| 7,636,584 | B2 * | 12/2009 | Anderson et al. .......... 455/556.2 |
| 8,593,660 | B1 * | 11/2013 | Cai .............................. 358/1.15 |
| 2002/0058530 | A1 * | 5/2002 | Akama ........................ 455/556 |
| 2002/0169002 | A1 * | 11/2002 | Imbrie et al. ................. 455/557 |
| 2003/0002073 | A1 * | 1/2003 | Berkema et al. ............. 358/1.15 |
| 2003/0038963 | A1 * | 2/2003 | Yamaguchi .................. 358/1.15 |
| 2003/0224765 | A1 * | 12/2003 | Udagawa et al. .......... 455/414.1 |
| 2003/0224812 | A1 * | 12/2003 | Gassho et al. ................ 455/509 |
| 2004/0130746 | A1 * | 7/2004 | Wu .............................. 358/1.15 |
| 2004/0137855 | A1 * | 7/2004 | Wiley et al. ..................... 455/88 |
| 2004/0185877 | A1 * | 9/2004 | Asthana et al. ............. 455/456.6 |

(Continued)

FOREIGN PATENT DOCUMENTS

| KR | 2005-25898 | 3/2005 |
| KR | 10-2005-0075559 | 7/2005 |

OTHER PUBLICATIONS

Korean Office Action Issued Oct. 25, 2013 in Corresponding Korean Application No. 10-2007-0068154.

*Primary Examiner* — Andrew Wendell
(74) *Attorney, Agent, or Firm* — Staas & Halsey LLP

(57) ABSTRACT

A mobile communication device storing a file to be printed, the mobile communication device including: a communication unit to receive printer information of a printer; a network interface unit to connect to a printer server corresponding to the printer information received through the communication unit; and a control unit to transmit the file to be printed to the printer through the printer server according to the received printer information. Accordingly, users can print files using a mobile communication device while traveling away from a fixed printer.

23 Claims, 5 Drawing Sheets

(56) References Cited

U.S. PATENT DOCUMENTS

| | | | |
|---|---|---|---|
| 2005/0136909 A1* | 6/2005 | Eguchi | 455/420 |
| 2005/0148326 A1* | 7/2005 | Nogawa et al. | 455/420 |
| 2005/0157329 A1 | 7/2005 | Park et al. | |
| 2007/0091329 A1* | 4/2007 | Zhang | 358/1.1 |
| 2007/0207765 A1* | 9/2007 | Nakahara et al. | 455/343.1 |
| 2008/0068642 A1* | 3/2008 | Takahashi | 358/1.15 |

* cited by examiner

MOBILE COMMUNICATION DEVICE, A PRINTING CONTROL SYSTEM, AND A METHOD FOR CONTROLLING PRINTING USING THE MOBILE COMMUNICATION DEVICE

CROSS-REFERENCE TO RELATED APPLICATION

This application claims the benefit of Korean Application No. 2007-068154, filed Jul. 6, 2007 in the Korean Intellectual Property Office, the disclosure of which is incorporated herein by reference.

BACKGROUND OF THE INVENTION

1. Field of the Invention

Aspects of the present invention relate to providing a mobile communication device, a printing control system, and a method of controlling printing using the mobile communication device, and more particularly, to providing a mobile communication device that acquires printer information using a Bluetooth adapter and controls a printing operation of a printer corresponding to the printer information, a printing control system, and a method of controlling printing using the mobile communication device.

2. Description of the Related Art

A printer is a type of image forming apparatus that is widely used in homes and offices. Printers have become essential devices in offices, and can be used by many people through a network. Furthermore, printers are easily used when in a fixed place. However, if a user frequently moves, it is difficult for the user to print desired documents outside of the fixed place (such as an office). To address this difficulty, a printing method using a mobile communication device (such as a cell phone, a personal digital assistant (PDA), etc.) has been developed. However, a drawback to this printing method is the difficulty in installing a printer driver in a mobile communication device. Even though the printer driver can be installed in the mobile communication device, different printer drivers may need to be installed for different mobile communication devices and for different printers, thereby reducing a user's convenience.

Moreover, mobile communication devices having a storage capacity lower than personal computers generally cannot install application programs to view files (such as Microsoft Word documents, Power Point documents, or Portable Document Format (PDF) files). As a result, it is difficult to convert and output documents. Therefore, there is a need for a printing method using a mobile communication device that can be used anywhere.

SUMMARY OF THE INVENTION

Aspects of the present invention provide a mobile communication device that acquires printer information using a Bluetooth adapter and controls a printing operation of a printer corresponding to the printer information so that printing is carried out regardless of a location, a printing control system, and a method of controlling printing using the mobile communication device.

According to an aspect of the present invention, there is provided a mobile communication device storing a file to be printed, the mobile communication device including: a communication unit to receive printer information of a printer; a network interface unit to connect to a printer server corresponding to the printer information received through the communication unit; and a control unit to transmit the file to be printed to the printer through the printer server according to the printer information.

The communication unit may request the printer information by a Bluetooth communication with a Bluetooth adapter that is connected to the printer, and may receive the printer information using the Bluetooth adapter.

The mobile communication device may further include a storage unit to store a list of files including the file to be printed, and a display unit to display the list, wherein if the file to be printed is selected, the control unit transmits the selected file to the printer server to be printed.

The mobile communication device may further include a display unit, wherein if the control unit receives information regarding an operational state of the printer from the printer server, the control unit may display the information regarding the operational state of the printer using the display unit.

The mobile communication device may further include a display unit, wherein if the control unit receives information regarding a printing status of the file to be printed from the printer server, the control unit may display the information regarding the printing status using the display unit.

The printer information may be an Internet Protocol (IP) address of the printer.

According to another aspect of the present invention, there is provided a method of controlling a printing operation of a mobile communication device, the method including: receiving printer information of a printer; and transmitting a file to be printed to the printer through a printer server corresponding to the received printer information, and carrying out the printing operation.

The receiving of the printer information may include requesting the printer information in a Bluetooth communication with a Bluetooth adapter that is connected to the printer, and receiving the printer information using the Bluetooth adapter.

The carrying out of the printing may include displaying a list of files, including the file to be printed, stored in the mobile communication device, and if the file to be printed is selected from the list, transmitting the selected file to the printer server to be printed.

The method may further include displaying information regarding an operational state of the printer if the information regarding the operational state of the printer is received from the printer server.

The method may further include displaying information regarding a printing status of the file to be printed if the information regarding the printing status is received from the printer server.

The printer information may be an Internet Protocol (IP) address of the printer.

According to another aspect of the present invention, there is provided a method of connecting a printer to a mobile communication device in order to print a file from the mobile communication device, the method including: connecting an adapter to the printer; reading out printer information from the printer to the adapter; and transmitting the printer information from the adapter to the mobile communication device in order for the mobile communication device to transmit the file to be printed by the printer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
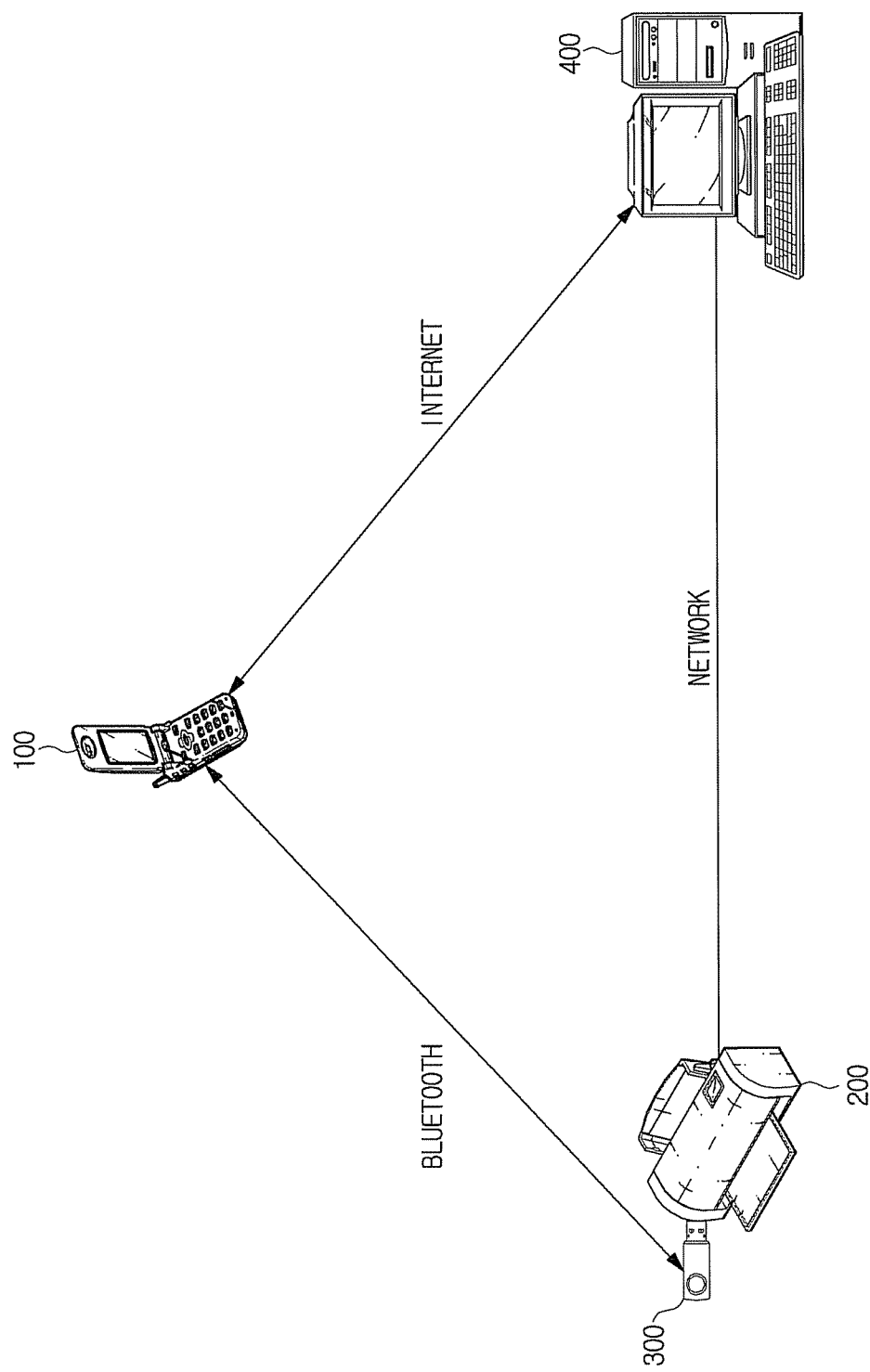
FIG. 1 is a mimetic diagram illustrating a printing control system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a mimetic diagram illustrating a printing control system according to an embodiment of the present invention. Referring to FIG. 1, the printing control system includes a mobile communication device 100, a printer 200, a Bluetooth adapter 300, and a printer server 400.

When a user wants to print a file stored in the mobile communication device 100 (for example, while away on a trip), the user may connect the Bluetooth adapter 300 to a printer 200 that is close to the user. The Bluetooth adapter 300 is a portable device that is connected to another device that does not have a Bluetooth function so that Bluetooth communications are enabled. For example, the Bluetooth adapter 300 may include a dongle. Furthermore, the Bluetooth adapter 300 may be connected to a Universal Serial Bus (USB) port of the printer 200. It is understood that according to other aspects, methods of wireless communication other than Bluetooth may be implemented. For example, an infrared adapter may be connected to the printer 200, and the infrared communication may be used to communicate between the mobile communication device 100 and the printer 200. Furthermore, the mobile communication device 100 may communicate directly to the printer 200 through the Internet.

If a file is selected to be printed, the mobile communication device 100 transmits a printer information request signal to the Bluetooth adapter 300. The Bluetooth adapter 300 receives the printer information request signal, and detects the printer information from the printer 200. The printer information may be the Internet Protocol (IP) address of the printer 200, and may be detected by searching for network information containing the IP address stored in the printer 200.

Subsequently, the mobile communication device 100 receives the printer information, and transmits the printer information and the file to be printed to the printer server 400. The mobile communication device 100 may transmit the printer information and the file to be printed using the IP address of the printer server 400. The user may manually set the IP address of the printer server 400 in the mobile communication device 100 (for example, after identifying the IP address of the printer server 400 from a server manager), or the mobile communication device 100 may detect and automatically set the IP address of the printer server. However, it is understood that aspects of the present invention are not limited thereto. For example, alternatively, when the printer 200 is installed, the IP address of the printer server 400 may be stored in the printer 200. Accordingly, when the printer information is requested by the mobile communication device 100, the IP address of the printer server 400 can be transmitted together with the printer information to the mobile communication device 100.

Furthermore, the IP address of the printer server 400 may be acquired using a broadcast method. In more detail, the mobile communication device 100 may broadcast a search signal to search for a printer server 400 connected to the printer 200 corresponding to the printer information (for example, the IP address of the printer 200). If a response signal responding to the search signal is received from one of the adjacent devices, the mobile communication device 100 transmits the printer information and the file to be printed to the printer server 400 that transmitted the response signal. According to another aspect of the present invention, the mobile communication device 100 may broadcast a search signal including the printer information (for example, the IP address of the printer 200). Furthermore, it is understood that according to other aspects, the printer 200 and the printer server 400 may be the same device, and may therefore have the same IP address.

The mobile communication device 100 transmits the printer information and the file to be printed to the printer server 400 over the Internet. The printer server 400 identifies the operational state of the printer 200 corresponding to the printer information. If the printer 200 is in a non-operational state, the printer server 400 transmits information regarding the operational state to the mobile communication device 100 so that the user is informed of the operational state information (for example, the operational state information may be displayed on a screen of the mobile communication device 100). Accordingly, the user can print using another printer. If the printer 200 is in an operational state, the printer server 400 transmits the file to be printed to the printer 200 so that a printing operation can be carried out.

The printer server 400 transmits information regarding the printing status of the printer 200 to the mobile communication device 100. For example, if the printing operation is completed or aborted, the printer server 400 can transmit information such as "printing completed" or "printing aborted" to the mobile communication device 100. The mobile communication device 100 may display the printing status information in the form of a message so that the user can check the printing status.

Using the printing control system according to aspects of the present invention, the user can print files while away on a trip using the portable mobile communication device 100 and the Bluetooth adapter 300.

Figure 2:
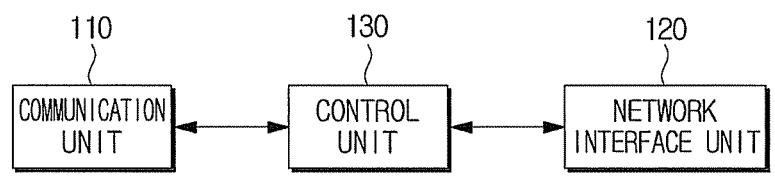
FIG. 2 is a block diagram illustrating a configuration of a mobile communication device according to an embodiment of the present invention.

FIG. 2 is a block diagram illustrating a configuration of a mobile communication device according to an embodiment of the present invention. Referring to FIG. 2, the mobile communication device 100 includes a communication unit 110, a network interface unit 120, and a control unit 130.

The communication unit 110 performs Bluetooth communication with external devices. Specifically, the communication unit 110 transmits a printer information request signal to the Bluetooth adapter 300 connected to the printer 200 and receives printer information.

The network interface unit 120 is connected to the printer server 400 over the Internet and communicates with the printer server 400. The printer server 400 corresponding to the printer information is connected to the printer corresponding to the printer information received through the communication unit 110 and controls a printing operation of the printer.

If the printer information is received through the communication unit 110, the control unit 130 operates the printer server 400 to transmit the file to be printed to the printer 200 corresponding to the printer information, and to print the file. Accordingly, printing jobs can be carried out while travelling using adjacent printers without installing a separate printer driver and application program in the mobile communication device 100.

Figure 3:
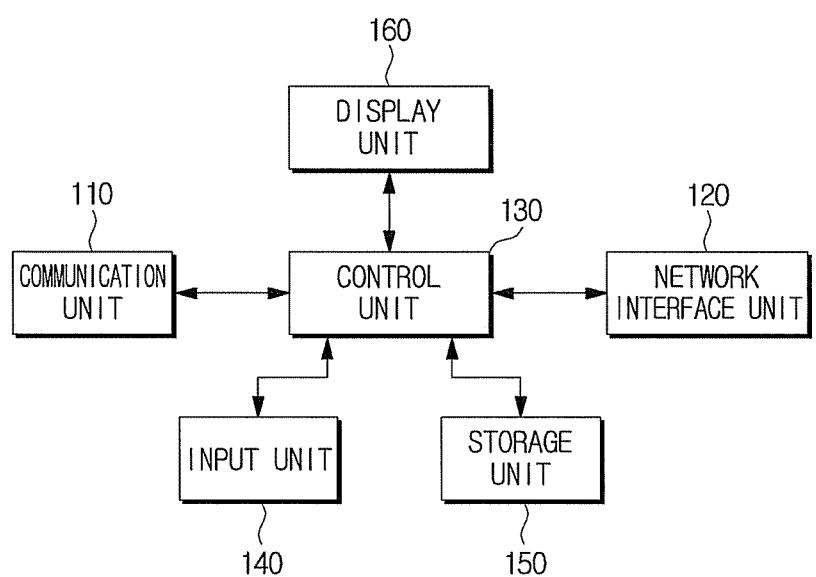
FIG. 3 is a block diagram illustrating in more detail the configuration of the mobile communication device of FIG. 2.

FIG. 3 is a block diagram illustrating in more detail the configuration of the mobile communication device of FIG. 2. Referring to FIG. 3, the mobile communication device 100 includes a communication unit 110, a network interface unit 120, an input unit 140, a storage unit 150, a display unit 160, and a control unit 130.

The communication unit 110 performs communications with external devices. Specifically, the communication unit 110 transmits a printer information request signal to the Bluetooth adapter 300 connected to the printer 200 and receives printer information.

The network interface unit 120 is connected to the printer server 400 over the Internet and communicates with the printer server 400.

The input unit 140 receives a signal input by the user. More specifically, if the user selects a certain function using, for example, keys mounted on an outside surface of the mobile communication device 100 or using a touch pad displayed on the screen, the input unit 140 receives a signal corresponding to the function.

The storage unit 150 stores a list of at least one file. The file may be generated in any of a variety of formats (such as Microsoft Word, Power Point, Portable Document Format (PDF), etc.). Each file may be listed in the form "file name.file extension." For example, if the file name is "presentation 1" and the file is generated in the Power Point format, the file may be listed as "presentation 1.ppt."

The display unit 160 displays the list of files on the screen of the mobile communication device 100. The user can determine file information from the file name and file extension in the displayed list of files. Furthermore, the display unit 160 may display a variety of information received from external devices in message form.

The control unit 130 controls the entire operation of the mobile communication device 100. Specifically, if at least one file is selected in the displayed list of files, the control unit 130 controls the communication unit 110 to externally output a printer information request signal. Then, once the printer information request signal is received by the Bluetooth adapter 300 connected to the printer 200, the Bluetooth adapter 300 determines printer information stored in the printer 200.

If the communication unit 110 receives the printer information, the control unit 130 transmits the file to be printed along with the printer information to the printer server 400. The printer server 400 transmits the file to be printed to the printer 200 corresponding to the printer information so that the printer can print the file. According to other aspects, the control unit 130 transmits the file directly to the printer 200. If the printer server 400 receives the printer information and the file to be printed from the mobile communication device 100, the printer server 400 may identify the operational state of the printer 200 corresponding to the printer information. More specifically, the printer server 400 may identify if the printer 200 is in an operational or non-operational state. If the printer 200 is in a non-operational state, the printer server 400 transmits this printer operational state information to the mobile communication device 100. Consequently, the mobile communication device 100 displays, for example, "non-operational state" in a message form so that the user can notice it. However, if the printer 200 is in an operational state, the printer server 400 converts the file to be printed into a printable format, and transmits the file to the printer 200.

The printer server 400 transmits printing operational state information of the printer 200 to the mobile communication device 100. For example, if the printing operation of the file to be printed is completed, a "printing completed" message may be transmitted to the mobile communication device 100 and displayed. If the printing operation of the file is stopped, a "printing aborted" message may be transmitted to the mobile communication device 100 and displayed. As a result, the user can more conveniently print files while travelling using the mobile communication device 100 and the Bluetooth adapter 300, and can also receive information regarding the printing operation.

Figure 4:
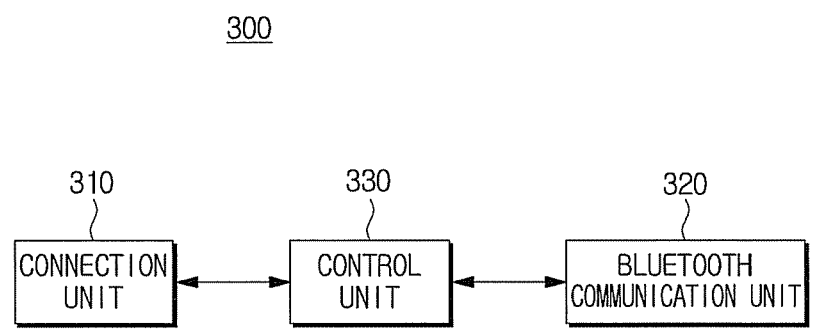
FIG. 4 is a block diagram illustrating a configuration of a Bluetooth adapter according to an embodiment of the present invention.

FIG. 4 is a block diagram illustrating a configuration of a Bluetooth adapter according to an embodiment of the present invention. Referring to FIG. 4, the Bluetooth adapter 300 includes a connection unit 310, a Bluetooth communication unit 320, and a control unit 330.

The connection unit 310 is connected to a connection terminal of an external device, and supports Bluetooth communication with the external device. The connection unit 310 may be implemented with a USB jack, and may be connected to a connection terminal of the printer 200 to support Bluetooth communication with the printer 200.

The Bluetooth communication unit 320 performs Bluetooth communication with the mobile communication device 100. More specifically, the Bluetooth communication unit 320 receives a printer information request signal from the mobile communication device 100, and transmits the printer information to the mobile communication device 100.

The control unit 330 detects printer information from the printer 200 when the Bluetooth adapter 300 is connected to the printer 200 through the connection unit 310 and the Bluetooth communication unit 320 receives the printer information request signal. For example, the printer information may be the IP address of the printer 200, which may be determined by searching network information stored in the printer 200 for an IP. Once the printer information is determined, the control unit 330 may transmit the printer information to the mobile communication device 100 through the connection unit 310.

According to an aspect of the present invention, the Bluetooth adapter 300 is a small portable device that may be connected to the mobile communication device 100 as an accessory, and may be detached from the mobile communication device 100 and connected to the printer 200 if required. Accordingly, the mobile communication device 100 carries out printing using the printer information acquired using the Bluetooth adapter 300.

Figure 5:
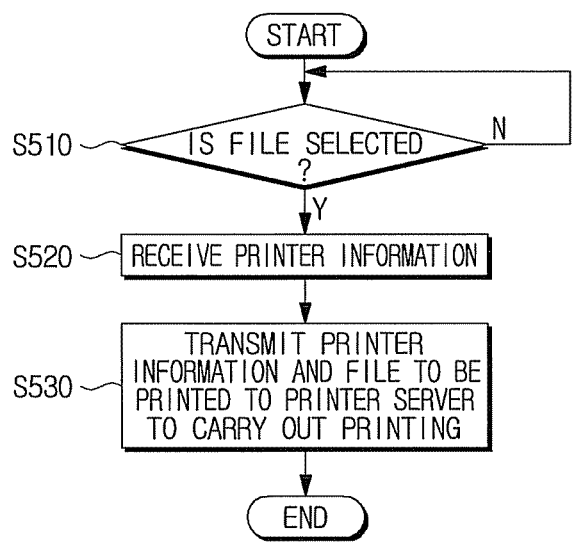
FIG. 5 is a flow chart illustrating a method of controlling a printing operation according to an embodiment of the present invention.

FIG. 5 is a flow chart illustrating a method of controlling a printing operation according to an embodiment of the present invention. Referring to FIG. 5, if at least one file is selected from a displayed list of files as a file to be printed in operation S510, the mobile communication device 100 receives printer information from the printer 200 in operation S520.

Next, the mobile communication device 100 transmits the received printer information and the file to be printed to the printer server 400 in operation S530. In this case, the mobile communication device 100 may transmit the received printer information and the file to be printed to the IP address of the printer server 400. As a result, the user can more conveniently print files while travelling by transmitting the files to an adjacent printer using the mobile communication device 100.

Figure 6:
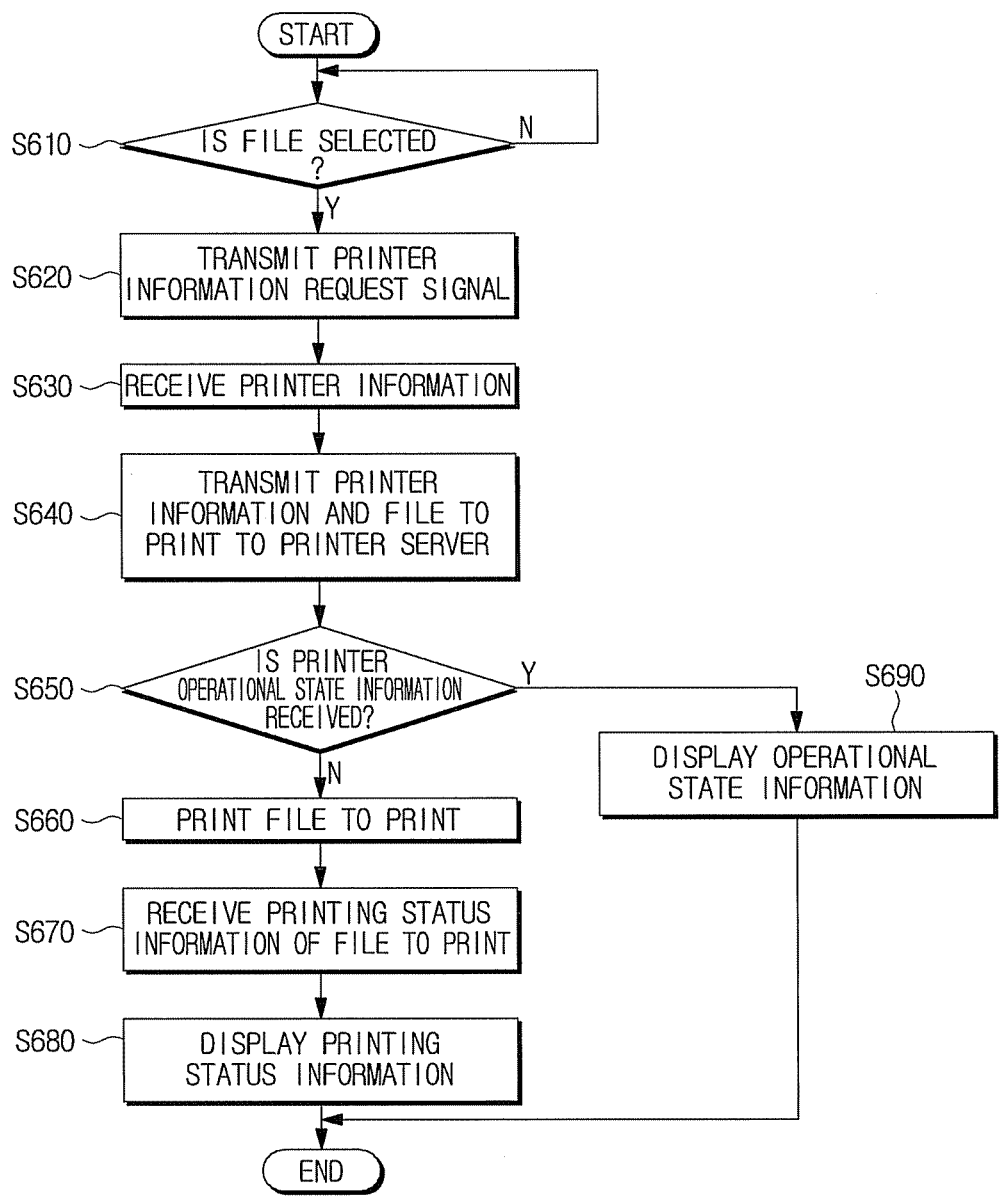
FIG. 6 is a flow chart illustrating in more detail the method of controlling the printing operation in FIG. 5.

FIG. 6 is a flow chart illustrating in more detail the method of controlling the printing operation in FIG. 5. Referring to FIG. 6, if at least one file is selected from a displayed list of files to be printed in operation S610, the mobile communication device 100 transmits a printer information request signal to the printer 200 in operation S620.

The mobile communication device 100 receives the printer information in operation S630, and transmits the received printer information and the file to be printed to the printer server 400 in operation S640. The printer server 400 identifies the operational state of the printer 200 corresponding to the printer information. If the printer 200 is in a non-operational state, the printer server 400 transmits information regarding the operational state to the mobile communication device 100.

The mobile communication device 100 receives the information regarding the operational state through the printer server 400 in operation S650, and displays the operational state information on the screen in operation S690. That is, the mobile communication device 100 displays, for example, "non-operational state" in a message form visible to the user. Therefore, the user can connect the Bluetooth adapter 300 to another printer in order to print the selected file (operation S610). If the printer 200 is in an operational state, the printer server 400 transmits the file to the printer 200 so that printing is carried out. The printer server 400 may transmit the file to the printer without sending a separate message to the mobile communication device 100. In this case, the file is read using a corresponding application program, converted into a printable format by a printer driver, and transmitted to the printer 200. Since the file is converted using the application program and the printer driver installed in the printer server 400, the mobile communication device 100 does not need to install a separate application program and a printer driver.

If the file is printed in operation S660, the mobile communication device 100 receives information regarding the printing status of the file from the printer server 400 in operation S670. The printing status information may be "printing completed", indicating completion of the printing operation, or "printing aborted", indicating that the printing has been aborted.

The mobile communication device 100 displays the printing status information in a message form in operation S680. However, it is understood that aspects of the present invention are not limited thereto. For example, the mobile communication device 100 may output a sound to indicate that the printing operation is completed and another sound to indicate that the printing operation is aborted. Using a printing control method according to aspects of the present invention, users can more conveniently print files using a Bluetooth adapter 300 and a mobile communication device 100, and identify information regarding a printing operation, thereby enhancing user convenience.

As can be appreciated from the above description, users can use adjacent printers to print files through a mobile communication device 100 and a Bluetooth adapter 300 when, for example, away from the office. Moreover, files to print are converted into printable format without installing a printer driver and application programs in a mobile communication device, further enhancing a user convenience.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mobile communication device storing a file to be printed, the mobile communication device comprising:
   a communication unit to receive printer information including an Internet Protocol (IP) address of a printer server directly from a printer;
   a network interface unit to connect to the printer server based on the printer information received through the communication unit; and
   a control unit to transmit the file to be printed to the printer through the printer server according to the received printer information.

2. The mobile communication device as claimed in claim 1, wherein the communication unit receives the printer information through Bluetooth communication with a Bluetooth adapter that is connected to the printer.

3. The mobile communication device as claimed in claim 2, wherein the communication unit requests the printer information through the Bluetooth communication with the Bluetooth adapter.

4. The mobile communication device as claimed in claim 1, further comprising:
   a storage unit to store a list comprising the file to be printed; and
   a display unit to display the list,
   wherein the control unit transmits the file to be printed to the printer server when the file to be printed is selected from the displayed list.

5. The mobile communication device as claimed in claim 1, further comprising a display unit,
   wherein the control unit receives information regarding an operational state of the printer from the printer server, and displays the information regarding the operational state of the printer using the display unit.

6. The mobile communication device as claimed in claim 1, further comprising a display unit,
   wherein the control unit receives information regarding a printing status of the file to be printed from the printer server, and displays the information regarding the printing status using the display unit.

7. The mobile communication device as claimed in claim 1, wherein the network interface unit broadcasts a search signal to search for the printer server.

8. The mobile communication device as claimed in claim 1, wherein the network interface unit uses the IP address of the printer server to connect to the printer server.

9. The mobile communication device as claimed in claim 1, wherein the mobile communication device does not store an application corresponding to a file type of the file to be printed.

10. The mobile communication device as claimed in claim 1, wherein the mobile communication device does not install or store a printer driver for the printer.

11. The mobile communication device as claimed in claim 1, wherein the printer information further includes an IP address of the printer.

12. A method of controlling a printing operation of a mobile communication device, the method comprising:
   receiving printer information including an Internet Protocol (IP) address of a printer server directly from a printer;
   connecting to the printer server based on the received printer information;

transmitting a file to be printed to the printer through the printer server according to the received printer information; and performing the printing operation using the received file to be printed.

13. The method as claimed in claim 12, wherein the receiving of the printer information comprises:

receiving the printer information through Bluetooth communication with a Bluetooth adapter that is connected to the printer.

14. The method as claimed in claim 13, wherein the receiving of the printer information further comprises:

requesting the printer information through the Bluetooth communication with the Bluetooth adapter.

15. The method as claimed in claim 12, wherein the transmitting of the file to be printed comprises:

displaying a list of files stored in the mobile communication device, the list of files comprising the file to be printed; and transmitting the file to be printed to the printer server when the file to be printed is selected from the displayed list.

16. The method as claimed in claim 12, further comprising:

receiving information regarding an operation state of the printer from the printer server; and displaying the information regarding the operational state of the printer.

17. The method as claimed in claim 12, further comprising:

receiving information regarding a printing status of the file to be printed from the printer server; and displaying the information regarding the printing status of the file to printed.

18. The method as claimed in claim 12, wherein the mobile communication device does not install or store a printer driver for the printer.

19. The method as claimed in claim 12, wherein the printer information further includes an IP address of the printer.

20. A method of connecting a printer to a mobile communication device in order to print a file from the mobile communication device, the method comprising:

connecting an adapter to the printer;

reading out printer information including an Internet Protocol (IP) address of a printer server directly from the printer to the adapter; and transmitting the printer information from the adapter to the mobile communication device in order for the mobile communication device to transmit the file to be printed by the printer to the print server based on the transmitted printer information.

21. The method as claimed in claim 20, wherein the adapter is a Bluetooth adapter that transmits the printer information to the mobile communication device through a Bluetooth communication.

22. The method as claimed in claim 20, wherein the mobile communication device does not install or store a printer driver for the printer.

23. The method as claimed in claim 20, wherein the printer information further includes an IP address of the printer.

\* \* \* \* \*